US008378643B2

(12) United States Patent
Arinaga et al.

(10) Patent No.: US 8,378,643 B2
(45) Date of Patent: Feb. 19, 2013

(54) WIND TURBINE GENERATOR, CONTROL METHOD FOR WIND TURBINE GENERATOR, WIND TURBINE GENERATOR SYSTEM, AND CONTROL METHOD FOR WIND TURBINE GENERATOR SYSTEM

(75) Inventors: Shinji Arinaga, Tokyo (JP); Tsuyoshi Wakasa, Tokyo (JP); Takatoshi Matsushita, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 362 days.

(21) Appl. No.: 12/845,984

(22) Filed: Jul. 29, 2010

(65) Prior Publication Data
US 2011/0031748 A1    Feb. 10, 2011

Related U.S. Application Data

(60) Provisional application No. 61/316,074, filed on Mar. 22, 2010.

(30) Foreign Application Priority Data

Aug. 6, 2009    (JP) .................................. 2009-183532

(51) Int. Cl.
*H02P 9/00*    (2006.01)
(52) U.S. Cl. ........................................... 322/29; 290/44
(58) Field of Classification Search ................. 290/44; 322/29
See application file for complete search history.

(56) References Cited

U.S. PATENT DOCUMENTS

| 5,225,712 | A  | * | 7/1993 | Erdman | 290/44 |
| 7,245,037 | B2 | * | 7/2007 | Angquist et al. | 290/44 |
| 7,345,373 | B2 | * | 3/2008 | Delmerico et al. | 290/44 |
| 2003/0155773 | A1 | * | 8/2003 | Wobben | 290/44 |
| 2007/0198133 | A1 | * | 8/2007 | Hirst | 700/295 |
| 2008/0093857 | A1 | * | 4/2008 | Stiesdal | 290/44 |
| 2008/0195255 | A1 | * | 8/2008 | Lutze et al. | 700/291 |
| 2010/0078940 | A1 | * | 4/2010 | Kondo et al. | 290/44 |
| 2011/0012352 | A1 | * | 1/2011 | Nelson et al. | 290/44 |
| 2012/0104756 | A1 | * | 5/2012 | Beekmann et al. | 290/44 |
| 2012/0161444 | A1 | * | 6/2012 | Tarnowski | 290/44 |

FOREIGN PATENT DOCUMENTS

| CA | 2409514 A1 | 11/2002 |
| EP | 1467463 A1 * | 10/2004 |
| JP | 11-56126 A | 3/1999 |
| JP | 11-69893 A | 3/1999 |
| JP | 2003-535561 A | 11/2003 |
| JP | 2008-278725 A | 11/2008 |

OTHER PUBLICATIONS

International Search Report of Application No. PCT/JP2010/058619 mailed Jun. 29, 2010.

* cited by examiner

*Primary Examiner* — Joseph Waks
(74) *Attorney, Agent, or Firm* — Kanesaka, Berner & Partners, LLP

(57) ABSTRACT

It is an object to stabilize a utility grid even when an unexpected fluctuation in the frequency of the utility grid occurs. A wind turbine generator includes a rotor that rotates by wind power, a generator that is driven by rotation of the rotor, and a control device that controls a power output of the generator to increase while a rotational speed of the generator decreases when a frequency of a utility grid becomes smaller than or equal to a predetermined rated frequency and when the rotational speed of the generator is greater than or equal to a first predetermined value. In this way, even when the frequency of the utility grid fluctuates, the frequency fluctuation can be suppressed, and the utility grid can be stabilized.

14 Claims, 9 Drawing Sheets

1; WIND TURBINE GENERATOR

WIND TURBINE GENERATOR, CONTROL METHOD FOR WIND TURBINE GENERATOR, WIND TURBINE GENERATOR SYSTEM, AND CONTROL METHOD FOR WIND TURBINE GENERATOR SYSTEM

This application claims the benefit of U.S. Provisional Application No. 61/316,074, filed on Mar. 22, 2010, the content of which is incorporated herein by reference. This application claims the benefit of Japanese Patent Application No. 2009-183532 filed in Japan on Aug. 6, 2009, the content of which is incorporated herein by reference.

BACKGROUND OF THE INVENTION

1. Field of the Invention

The present invention relates to a wind turbine generator, a control method for a wind turbine generator, a wind turbine generator system, and a control method for a wind turbine generator system.

2. Description of Related Art

Generally, an electric-power supply system is required to maintain the balance in supply and demand of the amount of electric power, the voltage, and the frequency at constant levels. Conventionally, in wind turbine generator, power output has been controlled by detecting the power output, rotational speed of the wind-turbine rotor, and so on and feeding back the detection results. However, control that reduces the frequency and the voltage fluctuation in the utility grid has not been performed. Therefore, by supplying the power output from the wind turbine generator independently of the state of the utility grid (supply and demand of electric power, load factor, frequency, voltage, etc.), there is a risk that the utility grid will be unstable.

Therefore, to connect the wind turbine generator to the utility grid, it is necessary to conform with a grid code, which sets the stability of voltage and frequency, the supply stability of reactive power, and the readiness in the event of failure. For example, even when the frequency of the utility grid fluctuates with reference to a predetermined rated frequency, when the fluctuation is within a predetermined time (for example, 10 seconds) and smaller than or equal to a predetermined value (for example, 5% of a reference frequency) set by the grid code, it is necessary to continue the operation of the wind turbine generator without disconnecting it.

Furthermore, when the utility grid becomes unstable, there is a demand for operation that is not only has no disconnection, but also more actively contributes to the stabilization of the utility grid. Accordingly, as a technique of controlling the power output of the wind turbine generator taking the status of the utility grid into account, Japanese Translation of PCT International Application, Publication No. 2003-535561 discloses a technique in which the power output of the wind turbine generator is dropped when the frequency of the utility grid rises.

BRIEF SUMMARY OF THE INVENTION

However, with the technique described in the above-mentioned Japanese Translation of PCT International Application, Publication No. 2003-535561, there is a problem in that the quality of the electric power cannot always be maintained because the power output is controlled only when the frequency of the utility grid rises, and a case in which the frequency is lowered is not taken into consideration.

The present invention has been conceived in light of the above-described problem, and it is an object thereof to provide a wind turbine generator, a control method for a wind turbine generator, a wind turbine generator system, and a control method for a wind turbine generator system that can contribute to the stabilization of the utility grid, for example, when a fluctuation in the frequency of the utility grid occurs.

To solve the above-described issue, the present invention employs the following solutions.

A first aspect of the present invention provides a wind turbine generator including a rotor that rotates by wind power; a generator that is driven by rotation of the rotor; and a control device that controls a power output of the generator to increase while the rotational speed of the generator decreases when the frequency of a utility grid becomes smaller than or equal to a predetermined rated frequency and when the rotational speed of the generator is greater than or equal to a first predetermined value.

According to the first aspect of the present invention, the control device controls the wind turbine generator to increase the power output when the frequency of the utility grid becomes smaller than or equal to a predetermined rated frequency. In general, the grid frequency fluctuates due to the power output of the generator connected to the grid and the balance in the consumed power in the grid, and the frequency drops when the power output is small compared with the consumed power. Thus, by increasing the power output when the frequency drops, the frequency can be raised and stabilization of the utility grid can be achieved. At this time, even when sufficient wind power is not acquired and the power output cannot be increased merely by manipulating the blade pitch angle, so long as the rotational speed of the generator is greater than or equal to a first predetermined value, the power output can be increased by controlling the inverter device and converting the inertial energy of the wind-turbine rotor to the power output. The first aspect of the present invention performs control to increase the power output when the rotational speed of the generator is greater than or equal to the first predetermined value regardless of a fluctuation in the rotational speed, that is to say, even when the rotational speed is decreased. In other words, the first aspect of the present invention provides a wind turbine generator including a rotor that rotates by wind power; a generator that is driven by rotation of the rotor; and a control device that controls a power output of the generator to increase when the frequency of a utility grid becomes smaller than or equal to a predetermined rated frequency and when the rotational speed of the generator is greater than or equal to a first predetermined value.

In the above-described wind turbine generator, it is desirable that the control device control the power output to decrease when the rotational speed of the generator becomes smaller than the first predetermined value.

When the rotational speed of the generator is lower than the first predetermined value, operation cannot be continued if the rotational speed drops even more. Therefore, when the rotational speed of the generator becomes smaller than a first predetermined value, a drop in the rotational speed of the generator is prevented by performing control so as to decrease the power output.

In the above described wind turbine generator, it is desirable that the control device perform control to maintain a predetermined rated output when the power output reaches the predetermined rated output.

From the point view of stabilization of the wind-power generating apparatus and the utility grid, and so on, it is most desirable that the power output of the wind turbine generator have a small fluctuation and that rated output be maintained. Therefore, control is performed to increase the power output and to maintain the rated output.

A second aspect of the present invention provides a wind turbine generator including a rotor that rotates by wind power; a generator that is driven by rotation of the rotor; and a control device that controls a power output of the generator to decrease while the rotational speed of the generator increases when the frequency of a utility grid becomes greater than or equal to a predetermined rated frequency and when the rotational speed of the generator is smaller than a second predetermined value.

According to the second aspect of the present invention, the control device controls the wind turbine generator so as to decrease power output when the frequency of a utility grid becomes greater than or equal to a predetermined rated frequency. Generally, the grid frequency fluctuations due to the balance in the power output of the generator connected to the grid and the power consumed by the grid, and when the power output is greater than the consumed power, the frequency rises. Thus, by decreasing the power output when the frequency rises, stabilization of the utility grid can be achieved by dropping the frequency. At this time, even when the power output does not sufficiently decrease merely by manipulating the blade pitch angle, so long as the rotational speed of the generator is smaller than a second predetermined value, the power output can be decreased by controlling the inverter device and converting wind power to inertial energy of the wind-turbine rotor. With the second aspect of the present invention, when the rotational speed of the generator is smaller than the second predetermined value, regardless of the fluctuation in the rotational speed, i.e., even when the rotational speed increases, control is performed to decrease the power output. In other words, the second aspect of the present invention provides a wind turbine generator including a rotor that rotates by wind power; a generator that is driven by rotation of the rotor; and a control device that controls a power output of the generator to decrease when the frequency of a utility grid becomes greater than or equal to a predetermined rated frequency and when the rotational speed of the generator is smaller than a second predetermined value.

With the above-described wind turbine generator, it is desirable that the control device control the power output to increase when the rotational speed of the generator becomes greater than or equal to the second predetermined value.

As described above, when the rotational speed of the generator becomes greater than or equal to the second predetermined value, if the rotational speed rises even more, there is a risk that the generator may be damaged by over-speed. Therefore, when the rotational speed of the generator becomes greater than or equal to the second predetermined value, control is performed so as to increase the power output to prevent a rise in the rotational speed of the generator.

With the above-described wind turbine generator, it is desirable that the control device perform control to maintain a predetermined power output when the power output drops to the predetermined power output.

When the power output of the wind turbine generator drops too much, it is necessary to temporarily disconnect the wind turbine generator from the grid and restart the wind turbine generator. Since restarting takes time, control is performed to maintain the minimum power output (predetermined output) to maintain grid linkage even when a frequency fluctuation in a short period of time occurs.

A third aspect of the present invention provides a control method for a wind turbine generator including a rotor that rotates by wind power and a generator that is driven by rotation of the rotor, the method including the step of controlling a power output of the generator to increase while the rotational speed of the generator decreases when the frequency of a utility grid becomes smaller than or equal to a predetermined rated frequency and when the rotational speed of the generator is greater than or equal to a first predetermined value.

A fourth aspect of the present invention provides a control method for a wind turbine generator including a rotor that rotates by wind power and a generator that is driven by rotation of the rotor, the method including the step of controlling a power output of the generator to decrease while the rotational speed of the generator increases when the frequency of a utility grid becomes greater than or equal to a predetermined rated frequency and when the rotational speed of the generator is smaller than a second predetermined value.

A fifth aspect of the present invention provides a wind turbine generator system including a plurality of wind turbine generators each including a rotor that rotates by wind power and a generator that is driven by rotation of the rotor; and a management and control device that controls the plurality of wind turbine generators by transmitting a predetermined control signal to the plurality of wind turbine generators, wherein the management and control device transmits a first control signal for increasing power output to the wind turbine generators when the frequency of a utility grid becomes smaller than or equal to a predetermined rated frequency, and wherein, in response to the first control signal, each of the wind turbine generators increases the power output of a generator thereof while the rotational speed of the generator thereof decreases when the rotational speed of the generator thereof is greater than or equal to a first predetermined value.

A sixth aspect of the present invention provides wind turbine generator system including a plurality of wind turbine generators each including a rotor that rotates by wind power and a generator that is driven by rotation of the rotor; and a management and control device that controls the plurality of wind turbine generators by transmitting a predetermined control signal to the plurality of wind turbine generators, wherein the management and control device transmits a second control signal for decreasing power output to the wind turbine generators when the frequency of a utility grid becomes greater than or equal to a predetermined rated frequency, and wherein, in response to the second control signal, each of the wind turbine generators decreases the power output of a generator thereof while the rotational speed of the generator thereof increases when the rotational speed of the generator thereof is smaller than to a second predetermined value.

A seventh aspect of the present invention provides a control method for a wind turbine generator system including a plurality of wind turbine generators each having a rotor that rotates by wind power and a generator that is driven by rotation of the rotor and a management and control device that controls the plurality of wind turbine generators by transmitting a predetermined control signal to the plurality of wind turbine generators, the method including a step of transmitting, from the management and control device to the wind turbine generators, a first control signal for increasing power output when the frequency of a utility grid becomes smaller than or equal to a predetermined rated frequency; and a step of increasing, in each of the wind turbine generators, the power output of a generator thereof in response to the first control signal while a rotational speed of the generator thereof decreases when the rotational speed of the generator thereof is greater than or equal to a first predetermined value.

An eighth aspect of the present invention provides a control method for a wind turbine generator system including a plurality of wind turbine generators each having a rotor that rotates by wind power and a generator that is driven by rotation of the rotor and a management and control device that controls the plurality of wind turbine generators by transmitting a predetermined control signal to the plurality of wind turbine generators, the method including a step of transmitting, from the management and control device to the wind turbine generators, a second control signal for decreasing power output when the frequency of a utility grid becomes greater than or equal to a predetermined rated frequency; and a step of decreasing, in each of the wind turbine generators, the power output of a generator thereof decreases in response to the second control signal while the rotational speed of the generator thereof increases when the rotational speed of the generator thereof is smaller than a second predetermined value.

According to the present invention, the utility grid can be stabilized, for example, even when a fluctuation occurs in the frequency of the utility grid.

DETAILED DESCRIPTION OF THE INVENTION

First Embodiment

An example of a wind turbine generator according a first embodiment of the present invention will be described below with reference to the drawings.

Figure 1:
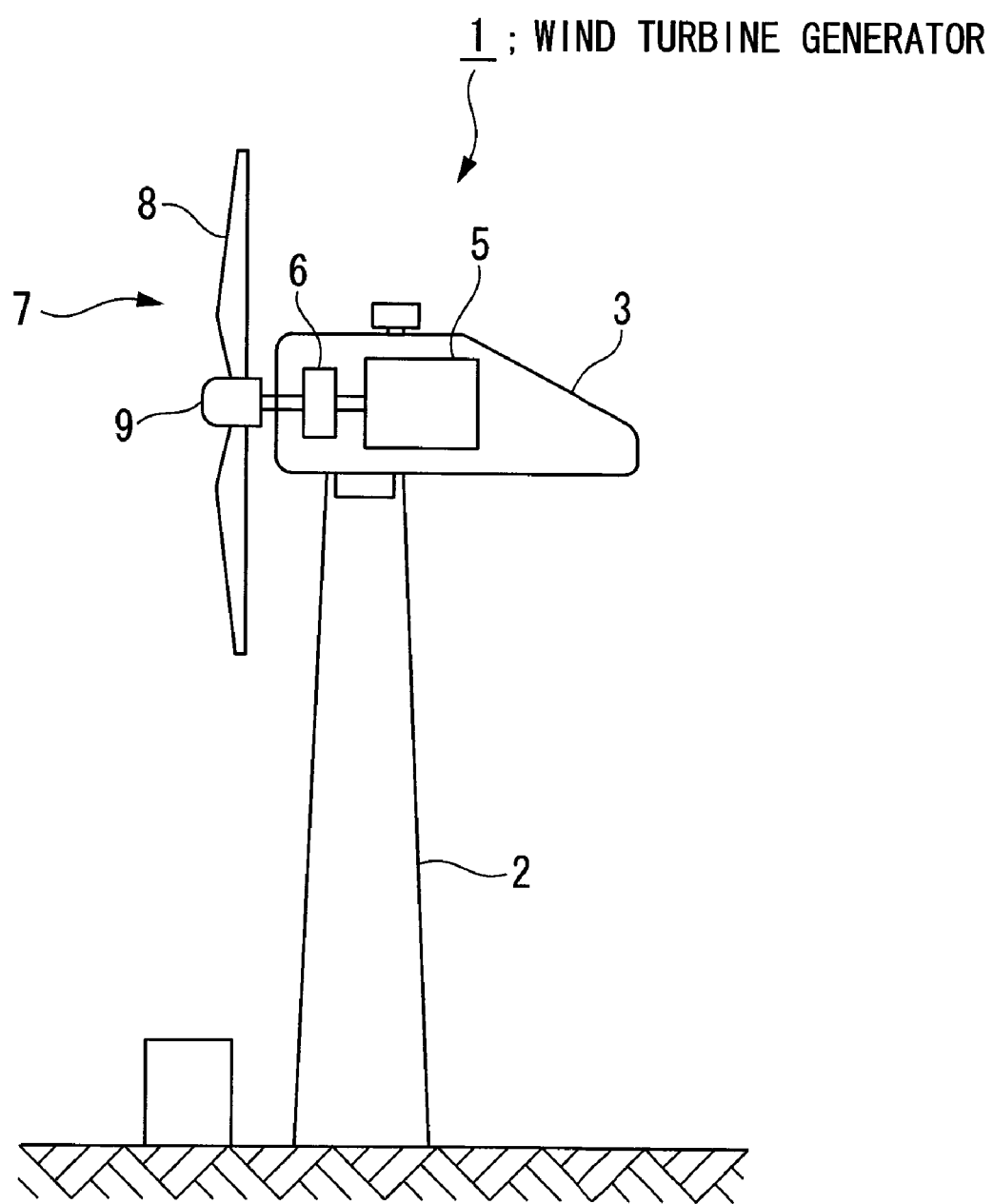
FIG. 1 is a side view illustrating the configuration of a wind turbine generator according to a first embodiment of the present invention.

FIG. 1 is a side view illustrating the configuration of a wind turbine generator 1 according to a first embodiment of the present invention. The wind turbine generator 1 includes a tower 2, a nacelle 3 mounted at the top of the tower 2, and a wind-turbine rotor 7. The nacelle 3 has a generator 5 and a gearbox 6, and the wind-turbine rotor 7, the gearbox 6, and the generator 5 are mechanically connected to transmit the rotation. The wind-turbine rotor 7 has a plurality of blades 8 and a hub 9, and the blades 8 are provided on the hub 9 in a radial pattern and in such a manner that their pitch angle is variably controllable. That is, the hub 9 is provided with a hydraulic cylinder (not shown) driving the blades 8 and a servo valve (not shown) supplying hydraulic pressure to the hydraulic cylinder, controls the hydraulic pressure supplied to the hydraulic cylinder by adjusting the degree of opening of the servo valve on the basis of a control signal from a pitch control unit, described below, and controls the blades 8 at a desired pitch angle.

In this way, the wind turbine generator 1 converts wind energy to electric energy by means of the blades 8 receiving wind energy to rotate the wind-turbine rotor 7, the gearbox 6 speeding up the rotation of the wind-turbine rotor 7, and then the generator 5 being driven by the rotation to generate power.

Figure 2:
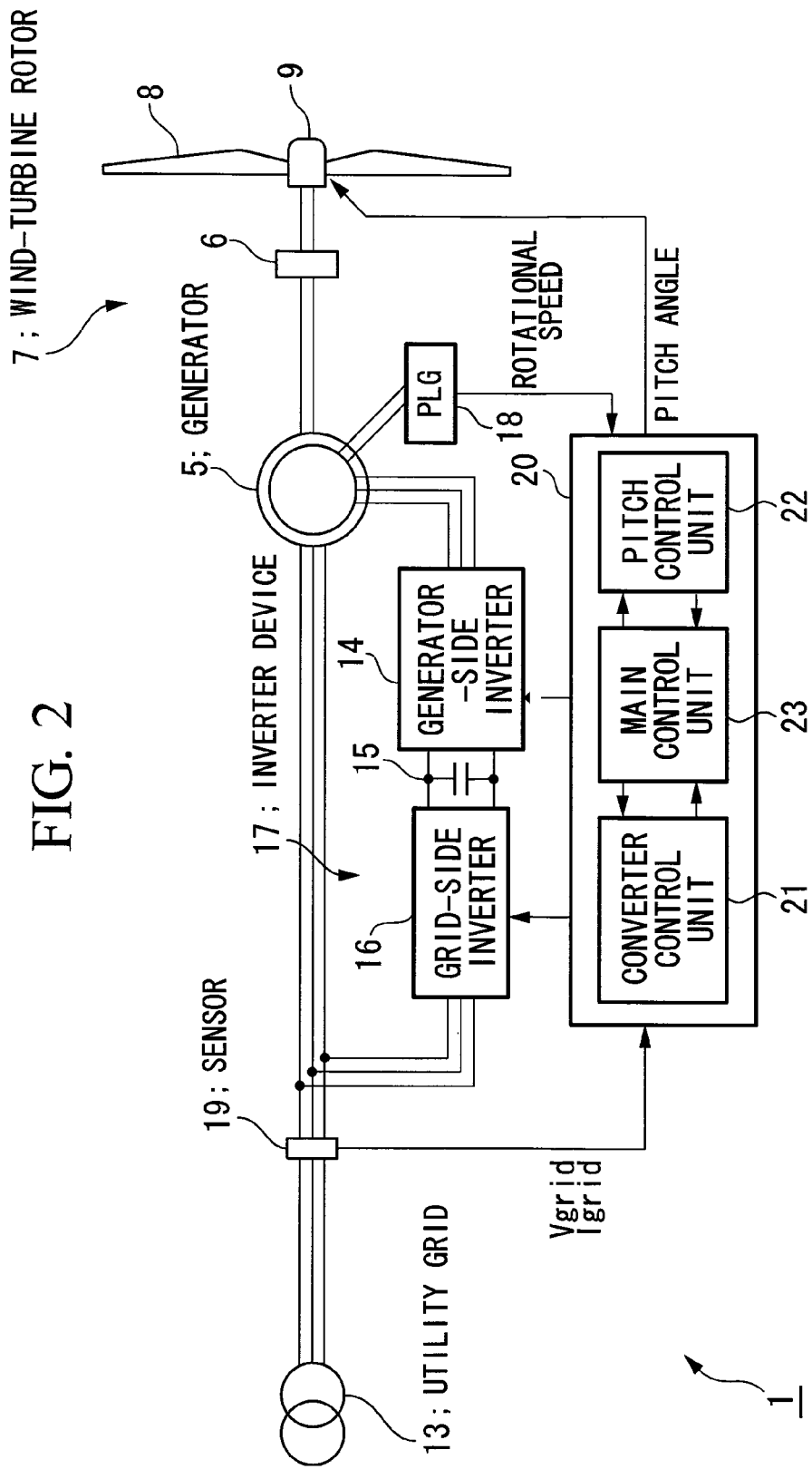
FIG. 2 is block diagram illustrating, in outline, the configuration of the wind turbine generator according to the first embodiment of the present invention.

FIG. 2 is a block diagram illustrating, in outline, the wind turbine generator 1. The wind turbine generator 1 is one type of doubly-fed variable-speed wind turbine system. That is, the wind turbine generator 1 in this embodiment is configured such that power generated at the generator 5 can be output to a utility grid 13 from both a stator winding and a rotor winding.

More specifically, in the generator 5, the stator winding is directly connected to the utility grid 13, and the rotor winding is connected to the utility grid 13 via an inverter device 17.

The inverter device 17 is constituted of a generator-side inverter 14, a DC bus 15, and a grid-side inverter 16, and AC power received from the rotor winding is converted to AC power matching the frequency of the utility grid 13. The generator-side inverter 14 converts the AC power generated at the rotor winding to DC power and outputs the DC power to the DC bus 15. The grid-side inverter 16 performs voltage control of the DC bus 15, and through this, the grid-side inverter 16 supplies and receives electric power to and from the grid. That is, the grid-side inverter 16 converts the DC power received from the DC bus 15 to AC power of a frequency that is the same as that of the utility grid 13 and outputs the AC power to the utility grid 13. The power output from the generator 5 to the utility grid 13 is controlled by the generator-side inverter 14.

The inverter device 17 also has a function for converting the AC power received from the utility grid 13 to AC power matching the frequency of the rotor winding, and this function may be used to excite the rotor winding depending on the operating state of the wind turbine generator 1. In such a case, the grid-side inverter 16 converts AC power to DC power and outputs the DC power to the DC bus 15. The generator-side inverter 14 converts the DC power received from the DC bus 15 to AC power matching the frequency of the rotor winding and supplies the AC power to the rotor winding of the generator 5.

The control system of the wind turbine generator 1 includes a PLG (pulse logic generator) 18, a sensor 19, and a control device 20. The PLG 18 measures the rotational speed of the generator 5 (hereinafter, referred to as "rotational speed") and outputs the measurement result to the control device 20.

The sensor 19 is provided on a power line connecting the generator 5 to the utility grid 13, measures a voltage Vgrid of the utility grid 13, an electrical current Igrid output from the generator 5 to the utility grid 13, and the frequency of the utility grid 13 (hereinafter, referred to as "grid frequency"), and outputs the measurement results to the control device 20.

The control device 20 includes a converter control unit 21, a pitch control unit 22, and a main control unit 23. The main control unit 23 calculates the power output to the utility grid 13 on the basis of the output current Igrid and the voltage Vgrid, which are outputs of the sensor 19. The main control unit 23 generates control signals for the converter control unit 21 and the pitch control unit 22 in response to the rotational speed, which is an output of the PLG 18, and the output current Igrid, the voltage Vgrid, and the grid frequency, which are outputs of the sensor 19. The converter control unit 21 controls the power output of the wind turbine generator 1 by controlling a power transistor of the generator-side inverter 14 on the basis of a control signal from the main control unit 23. The voltage of the DC bus 15 is controlled to a predetermined value by controlling a power transistor of the grid-side inverter 16.

The pitch control unit 22 controls the pitch angle of the blades 8 on the basis of a control signal from the main control unit 23.

The converter control unit 21 carries out control such that the power output increases regardless of a fluctuation in the rotational speed of the generator 5 when the grid frequency is smaller than or equal to a predetermined rated frequency and when the rotational speed of the generator 5 is greater than or equal to a lower limit (first predetermined value).

More specifically, for example, when the wind speed drops and the rotational speed of the generator 5 drops, power output also drops in this state. The converter control unit 21 according to this embodiment, however, carries out control to increase the power output even when the rotational speed of the generator 5 drops. To increase the power output, for example, the pitch angle of the blades 8 is controlled by the pitch control unit 22 so as to be set to "fine", on the basis of a control signal from the main control unit 23. The generator torque is increased by controlling the inverter device 17 with the converter control unit 21 on the basis of a control signal from the main control unit 23 to convert and collect inertial energy of the wind-turbine rotor 7 to power output.

Then, the pitch control unit 22 and the converter control unit 21 control the blades 8 and the inverter device 17, respectively, so as to maintain the rated the power when power output of the wind turbine generator 1 increases and reaches the rated power. Furthermore, when the rotational speed of the generator 5 becomes smaller than the lower limit, control is performed to decrease the power output, and, in this way, the rotational speed of the generator 5 is raised.

The converter control unit 21 performs control to decrease the power output when the grid frequency is greater than or equal to a predetermined rated frequency and when the rotational speed of the generator 5 is smaller than an upper limit (second predetermined value). To decrease the power output, for example, the pitch angle of the blades 8 is controlled by the pitch control unit 22 so as to be set to "feather", on the basis of a control signal from the main control unit 23. The power output is reduced by lowering the generator torque by controlling the inverter device 17 with the converter control unit 21 on the basis of the control signal from the main control unit 23 and by converting/preserving wind power acting upon the blades 8 as inertial energy of the wind-turbine rotor 7.

Then, the pitch control unit 22 and the converter control unit 21 perform control so as to maintain power output of a predetermined lower limit when the power output of the wind turbine generator 1 decreases and when the power output decreases to the lower limit (predetermined output). Furthermore, when the rotational speed of the generator 5 becomes greater than or equal to the upper limit, control is performed to increase the power output. In this way, over-speed of the generator 5 is prevented.

The control method for the thus-configured wind turbine generator 1 will be described below with reference to FIGS. 3 to 6B.

Figure 3:
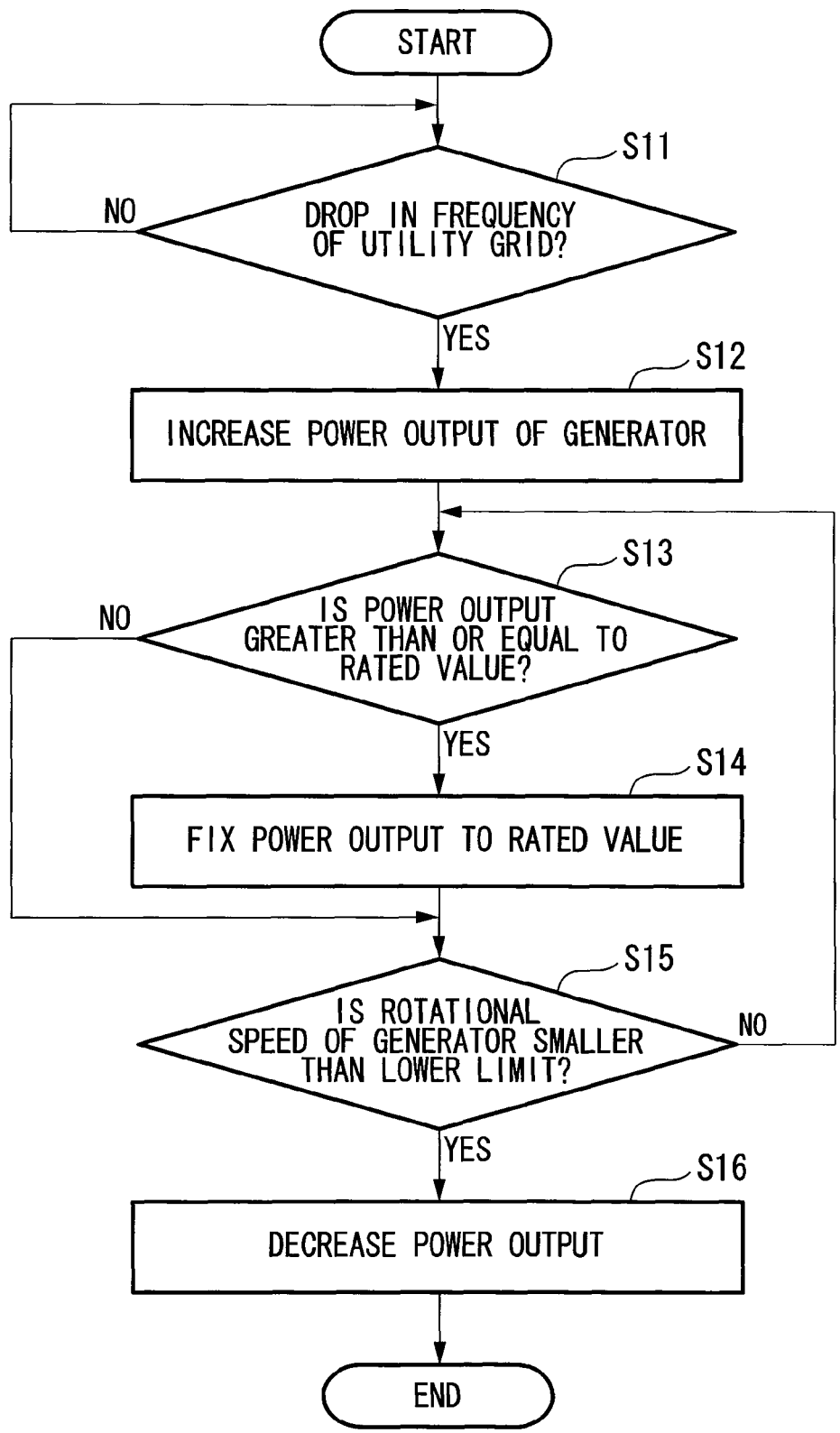
FIG. 3 is a flow chart illustrating a control process for when the frequency of a utility grid drops, in the wind turbine generator according to the first embodiment of the present invention.
Figure 4:
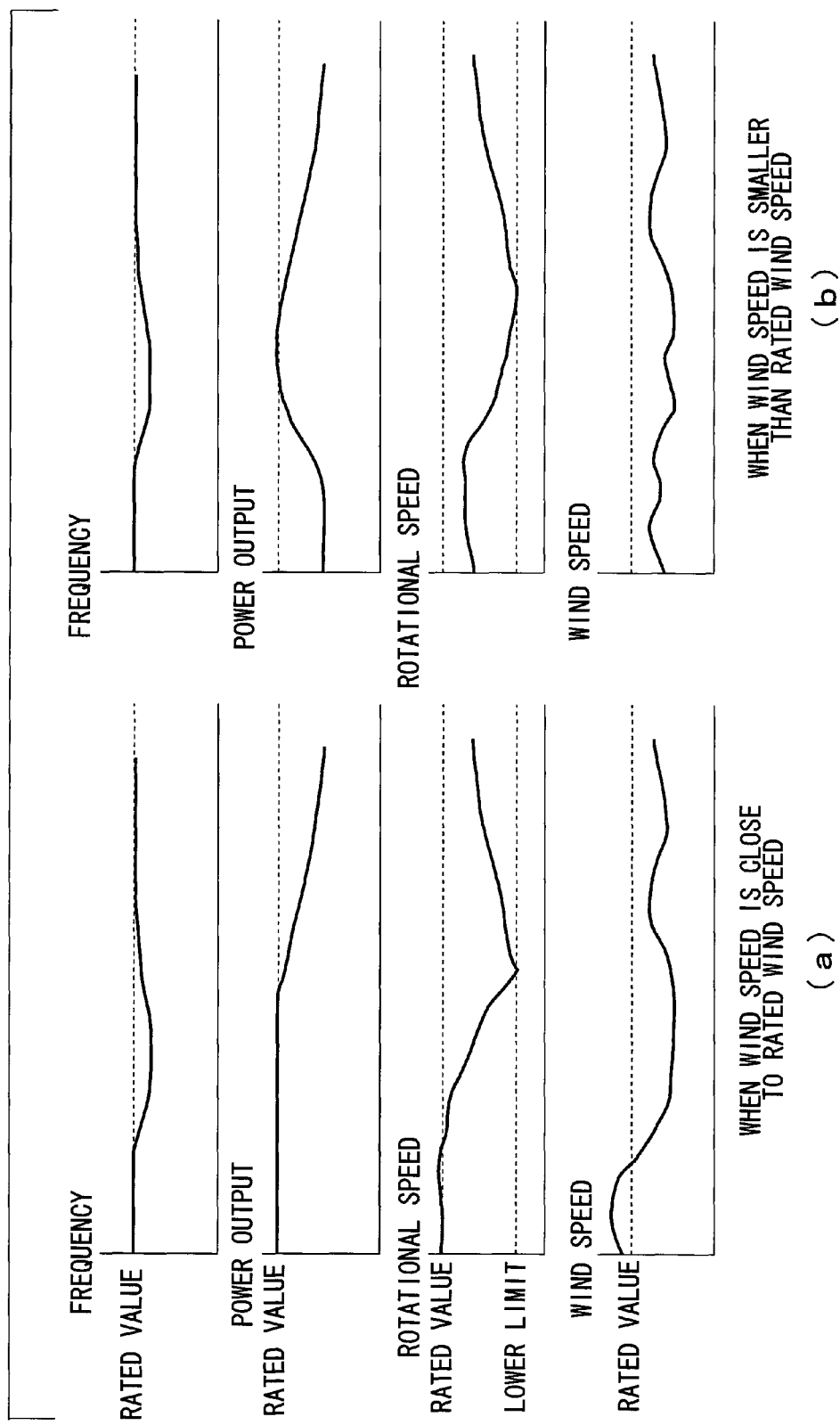
FIG. 4A is a graph representing changes in frequency, power output, rotational speed, and wind speed when the frequency of the utility grid drops, in the wind turbine generator according to the first embodiment of the present invention.
FIG. 4B is graph representing changes in frequency, power output, rotational speed, and wind speed when the frequency of the utility grid drops, in the wind turbine generator according to the first embodiment of the present invention.

FIG. 3 is a flow chart illustrating a control process for when the frequency of the utility grid 13 drops, in the wind-power generating apparatus 1 according to this embodiment.

In the wind turbine generator 1, the sensor 19 detects the grid frequency and outputs the detection result to the control device 20. In Step S11 in FIG. 3, the control device 20 determines whether or not the grid frequency has dropped to a value smaller than or equal to a predetermined rated frequency in response to the output of the sensor 19. When it is determined that the grid frequency is not smaller than or equal to the rated frequency, the processing in Step S11 is repeated, and, subsequently, it is determined whether or not the grid frequency has dropped with respect to the detection result from the sensor 19 at predetermined intervals. In Step S11, when it is determined that the grid frequency is smaller than or equal to the predetermined rated frequency, the process proceeds to the next Step S12.

In the next Step S12, the control device 20 controls the wind turbine generator 1 so that power output increases in response to a drop in the grid frequency. This is to stabilize the utility grid 13 by suppressing a fluctuation in the grid frequency by raising the power output. Specifically, the main control unit 23 outputs output-increase control signals to the converter control unit 21 and the pitch control unit 22 so as to increase the power output. Then, in response to these output-increase control signals, the pitch control unit 22 performs control to set the pitch angle of the blades 8 to "fine", or the converter control unit 21 controls the generator-side inverter 14 to increase the power output.

For example, as illustrated in FIG. 4A, when the wind speed is close to a rated wind speed, the main control unit 23 outputs the output-increase control signals when the grid frequency drops. In response to the output-increase control signal, the pitch control unit 22 performs control to set the pitch angle of the blades 8 to "fine" to increase the power output. When pitch-angle control is not enough to maintain the power output at the rated value due to a drop in the rotational speed of the generator 5 because of a drop in wind speed although the pitch angle of the blades 8 is set to "fine", the converter control unit 21 further controls the generator-side inverter 14 so as to increase the power output by converting the rotor inertial energy to power output.

As illustrated in FIG. 4B, when the wind speed is smaller than the rated wind speed, the power output is also smaller than the rated value. In such a case, since normally the pitch angle of the blades 8 is already set to "fine", when the grid frequency drops, the converter control unit 21 controls the generator-side inverter 14 so as to increase the power output by converting the rotor inertial energy to power output.

In the next Step S13, the main control unit 23 calculates the power output to the utility grid 13 in response to the detection results of the output current Igrid and the voltage Vgrid from the sensor 19 and determines whether or not the power output, which is the calculated result, is greater than or equal to a predetermined rated value. According to this determination, when the power output is smaller than the predetermined rated value, the process proceeds to Step S15, and when the power output is greater than or equal to the predetermined rated value, the process proceeds to Step S14. In Step S14, the power output is maintained at the rated value by the control device 20 controlling the pitch angle of the blades 8 and the generator-side inverter 14.

In Step S15, it is determined whether or not the rotational speed of the generator 5 is smaller than the lower limit. According to this determination, when it is determined that the rotational speed of the generator 5 is not smaller than the lower limit, the process returns to Step S13 to repeat the above-described processing, and when it is determined that the rotational speed of the generator 5 is smaller than the lower limit, the process proceeds to the next Step S16. In Step S16, the operation of the wind turbine generator 1 cannot be continued when the rotational speed decreases even further when the rotational speed of the generator 5 is smaller than the lower limit; therefore, to avoid this, the control device 20 raises the rotational speed of the generator 5 by controlling the wind turbine generator 1 so as to decrease the power output, and then the routine ends.

Figure 5:
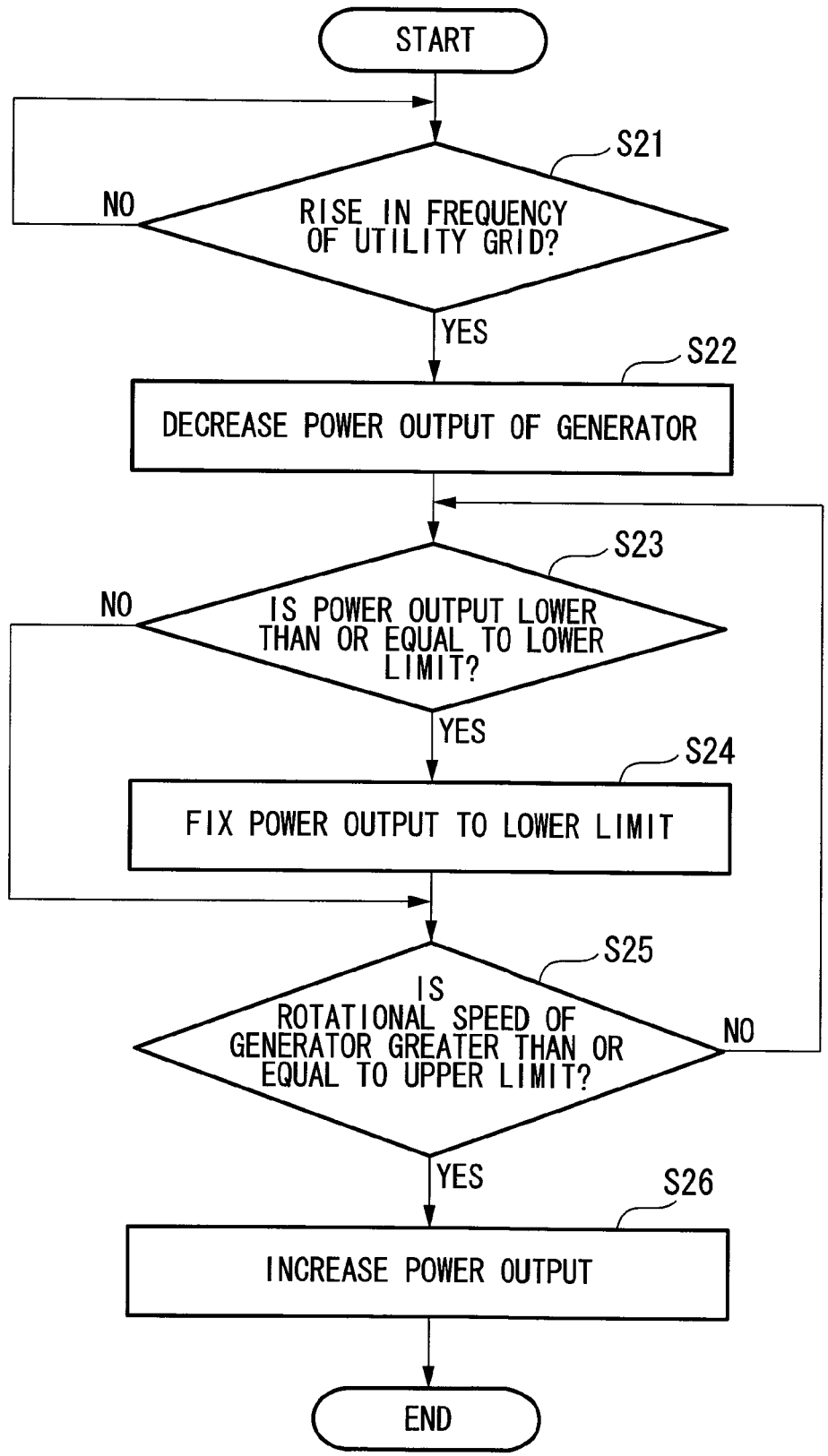
FIG. 5 is a flow chart illustrating a control process for when the frequency of the utility grid rises, in the wind turbine generator according to the first embodiment of the present invention.
Figure 6:
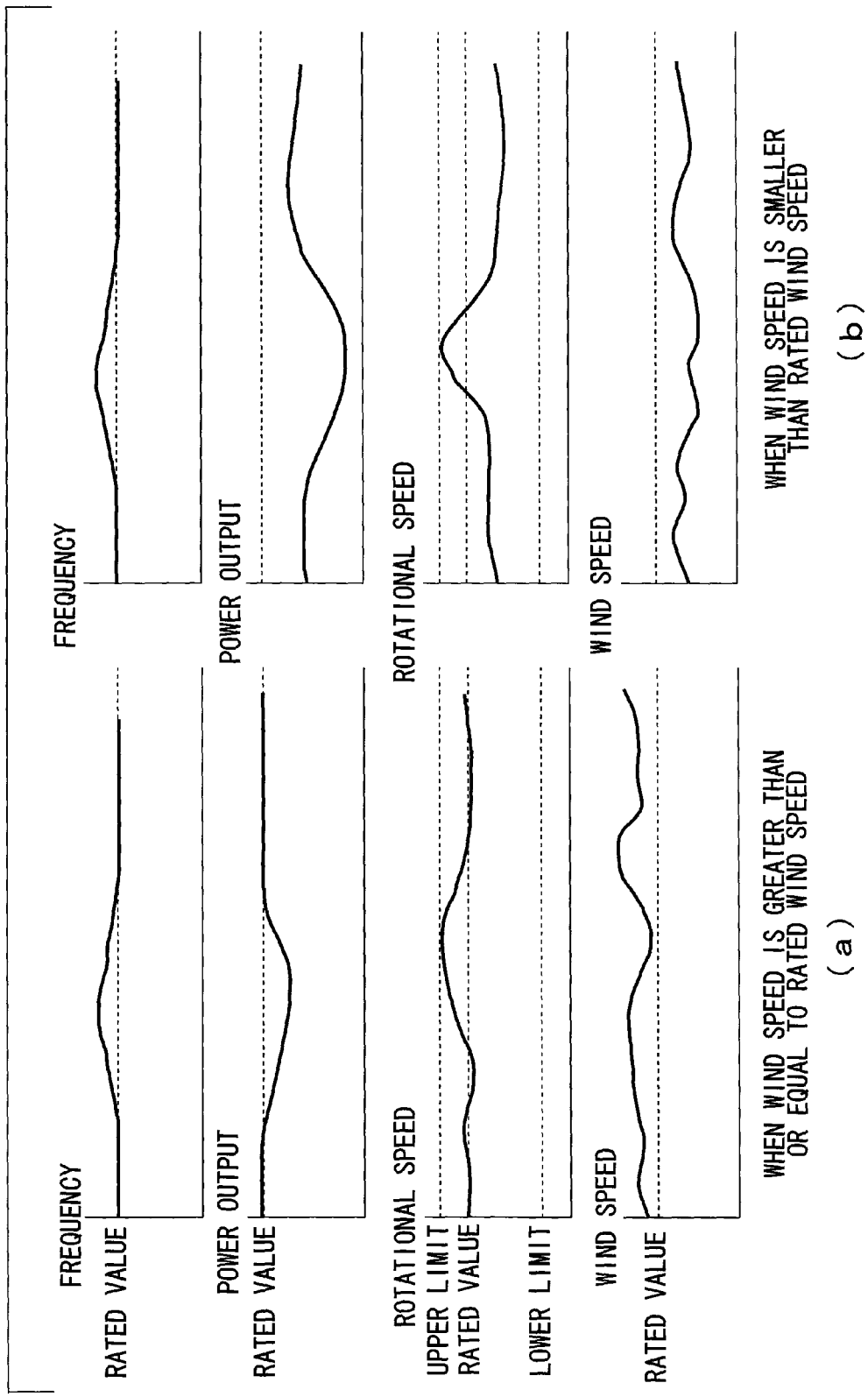
FIG. 6A is graph representing changes in frequency, power output, rotational speed, and wind speed when the frequency of the utility grid rises, in the wind turbine generator according to the first embodiment of the present invention.
FIG. 6B is graph representing changes in frequency, power output, rotational speed, and wind speed when the frequency of the utility grid rises, in the wind turbine generator according to the first embodiment of the present invention.

FIG. 5 is a flow chart illustrating the control process for when the frequency of the utility grid 13 rises, in the wind turbine generator 1 according to this embodiment.

In the wind turbine generator 1, the sensor 19 detects the grid frequency, and the detection result is output to the control device 20. In Step S21 in FIG. 5, the control device 20 determines whether or not the grid frequency has risen in response to the output from the sensor 19 and become greater than or equal to the predetermined rated frequency. When it is determined that the grid frequency is not greater than or equal to the rated frequency, the processing in Step S21 is repeated, and, subsequently, it is determined whether or not the grid frequency has risen with respect to the detection result of the sensor 19 at predetermined intervals. In Step S21, when it is determined that the grid frequency is greater than or equal to the predetermined rated frequency, the process proceeds to the next Step S22.

In the next Step S22, the control device 20 controls the wind turbine generator 1 such that the power output decreases in response to a rise in the grid frequency. This is to stabilize the utility grid 13 by suppressing a fluctuation in the grid frequency by decreasing the power output. Specifically, the main control unit 23 outputs output-decrease control signals to the converter control unit 21 and the pitch control unit 22 so as to decrease the power output. Then, in response to these output-decrease control signals, the pitch control unit 22 performs control to set the pitch angle of the blades 8 to "feather", or the converter control unit 21 controls the generator-side inverter 14 to decrease the power output.

For example, as illustrated in FIG. 6A, when the wind speed is greater than or equal to the rated wind speed and when the grid frequency rises, the pitch control unit 22 performs control to set the pitch angle of the blades 8 to "feather" in response to the output-decrease control signal. Even when the pitch angle of the blades 8 is set to "feather", when the power output does not sufficiently decrease or when the power needs to be decreased even more, the generator-side inverter 14 is controlled so as to decrease the power output.

As illustrated in FIG. 6B, when the wind speed is smaller than the rated wind speed, the power output is also smaller than the rated value. In such a case, when the grid frequency rises, the generator-side inverter 14 is controlled so as to further decrease the power output.

In the next Step S23, the main control unit 23 calculates the power output to the utility grid 13 in response to the detection results of the output current Igrid and the voltage Vgrid from the sensor 19 and determines whether or not the power output, which is the calculated result, is smaller than or equal to the predetermined lower limit. According to this determination, when the power output is smaller than or equal to the predetermined lower limit, the process proceeds to Step S25, and when the power output is determined not to be smaller than or equal to the predetermined lower limit, the process proceeds to Step S24. In Step S24, the power output is maintained at the lower limit by the control device 20 controlling the pitch angle of the blades 8 and the generator-side inverter 14.

In Step S25, it is determined whether or not the rotational speed of the generator 5 is greater than or equal to the upper limit. This is because the inverter control in Step S22 acts in a direction to raise the rotational speed of the generator 5. According to this determination, when it is determined that the rotational speed of the generator 5 is not greater than or equal to the upper limit, the process returns to Step S23 to repeat the above-described processing, and when it is determined that the rotational speed of the generator 5 is greater than or equal to the upper limit, the process proceeds to the next Step S26. In Step S26, if the operation of the wind turbine generator 1 is continued as-is when the rotational speed of the generator 5 is greater than or equal to the upper limit, the generator might be damaged by over-speed. To avoid this, the control device 20 controls the generator-side inverter 14 so as to increase the power output so that the rotational speed drops, and then the routine ends.

As described above, in the case there is a fluctuation in the grid frequency, when the frequency is smaller than or equal to the predetermined rated frequency after a predetermined amount of time elapses or when the frequency is greater than or equal to the predetermined rated frequency after a predetermined amount of time elapses, even though the power output is controlled such that it is increased or decreased, the influence on the utility grid is taken into consideration, and the operation of the wind turbine generator 1 is stopped.

The embodiment described above has a configuration in which the fluctuation in the frequency is determined with reference to a predetermined rated frequency. The configuration, however, is not limited thereto and may be a configuration in which an allowable range is set for the predetermined rated frequency, and the fluctuation in the frequency is determined on the basis of whether or not the frequency is within the allowable range.

In this way, when a frequency fluctuation occurs in the utility grid, normally, the power output depends on the wind conditions and/or the rotational speed of the generator. However, according to this embodiment, stabilization of the utility grid can be achieved by arbitrarily increasing or decreasing the power output of the wind turbine generator to correspond to the fluctuation in the frequency of the utility grid under various wind conditions and with various rotational speeds of the generator.

The embodiment described above has a configuration in which a so-called winding induction generator is used as the generator 5; the inverter device 17, which is constituted of the generator-side inverter 14, the DC bus 15, and the grid-side inverter 16, is used; the stator winding of the generator 5 is directly connected to the utility grid 13; and the rotor winding is connected to the utility grid 13 via the inverter device 17 (see FIG. 2). In such a case, since the stator winding of the generator is directly connected to the utility grid, when the frequency of the utility grid fluctuates, the generator output is directly influenced.

Figure 7:
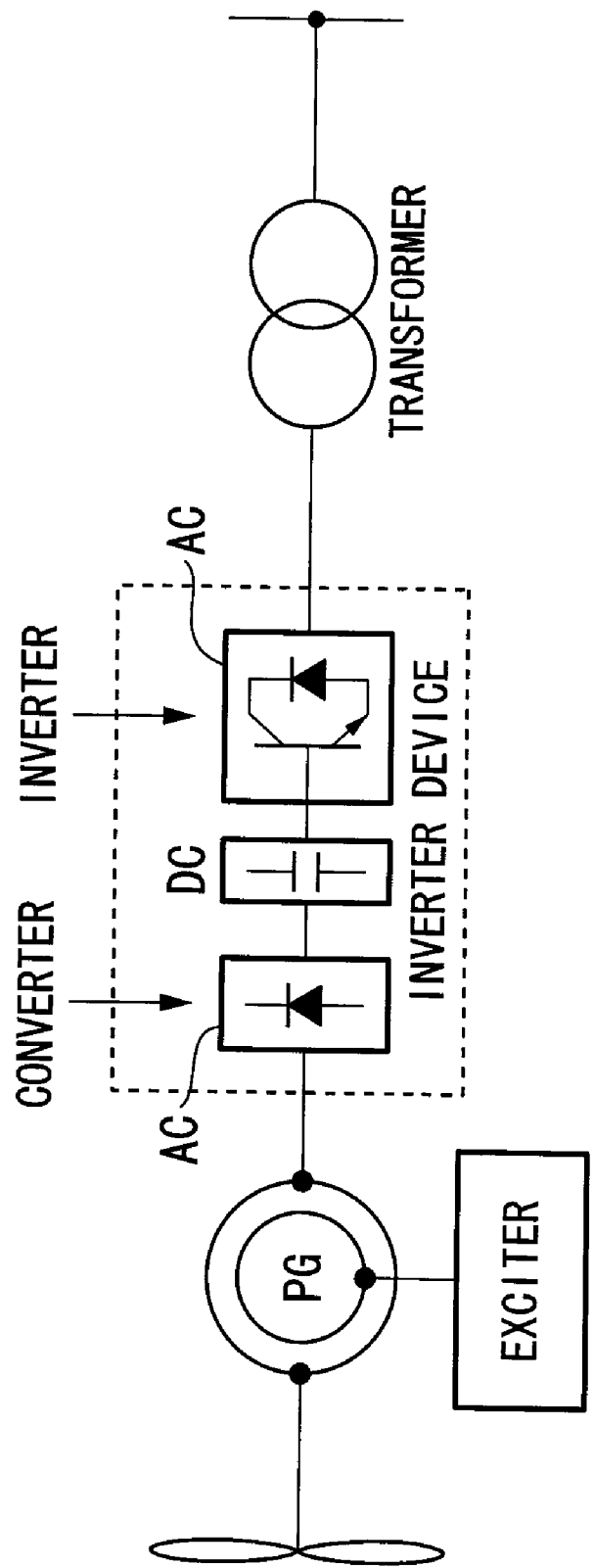
FIG. 7 is a block diagram illustrating another example of a generator and an inverter device applied to the wind turbine generator according to the first embodiment of the present invention.

Instead of the configuration described above, as illustrated in FIG. 7, the configuration can be such that a multi-polar synchronous generator is used as the generator, and the stator winding is connected to the utility grid via an inverter device formed of an inverter and a converter.

With such a configuration, since the generator and the utility grid are connected via the inverter device, a frequency fluctuation in the utility grid does not affect the generator. That is, control of the generator-side inverter when the frequency of the utility grid fluctuates is easier compared with that of the above-described configuration of the generator 5 illustrated in FIG. 2.

Second Embodiment

Next, a second embodiment of the present invention will be described with reference to FIG. 8 or 9.

This embodiment relates to a wind turbine generator system, referred to as "wind park" or "wind farm", provided with a plurality of the above-described wind turbine generators 1 according to the first embodiment. The wind turbine generator system according to this embodiment includes a plurality of the wind turbine generators 1 and a management and control device, which is bi-directionally connected to the plurality of wind turbine generators 1 via communication lines in such a manner that transmission and reception of information such as control signals are possible and which manages and controls each of the wind turbine generators.

The management and control device can be implemented by using a general-purpose or specialized computer that is provided with a central processing unit (CPU), a read only memory (ROM), a random access memory (RAM), and so on and a program that operates on the computer. In such a case, the CPU etc. functions as the management and control device to manage and control the wind turbine generators by reading out a program recorded on a computer-readable recording medium on which a program for realizing the above-described processing entirely or partially is recorded, loading the program in the ROM and/or the RAM, and performing processing and computation of information.

The computer-readable recording medium mentioned here is a magnetic disk, a magneto-optical disk, a CD-ROM, a DVD-ROM, a semiconductor memory, or the like. The computer program may be delivered through a communication line, and the computer that receives the delivery may execute the program.

A control method for a wind turbine generator system will be described below with reference to FIGS. 8 and 9.

Figure 8:
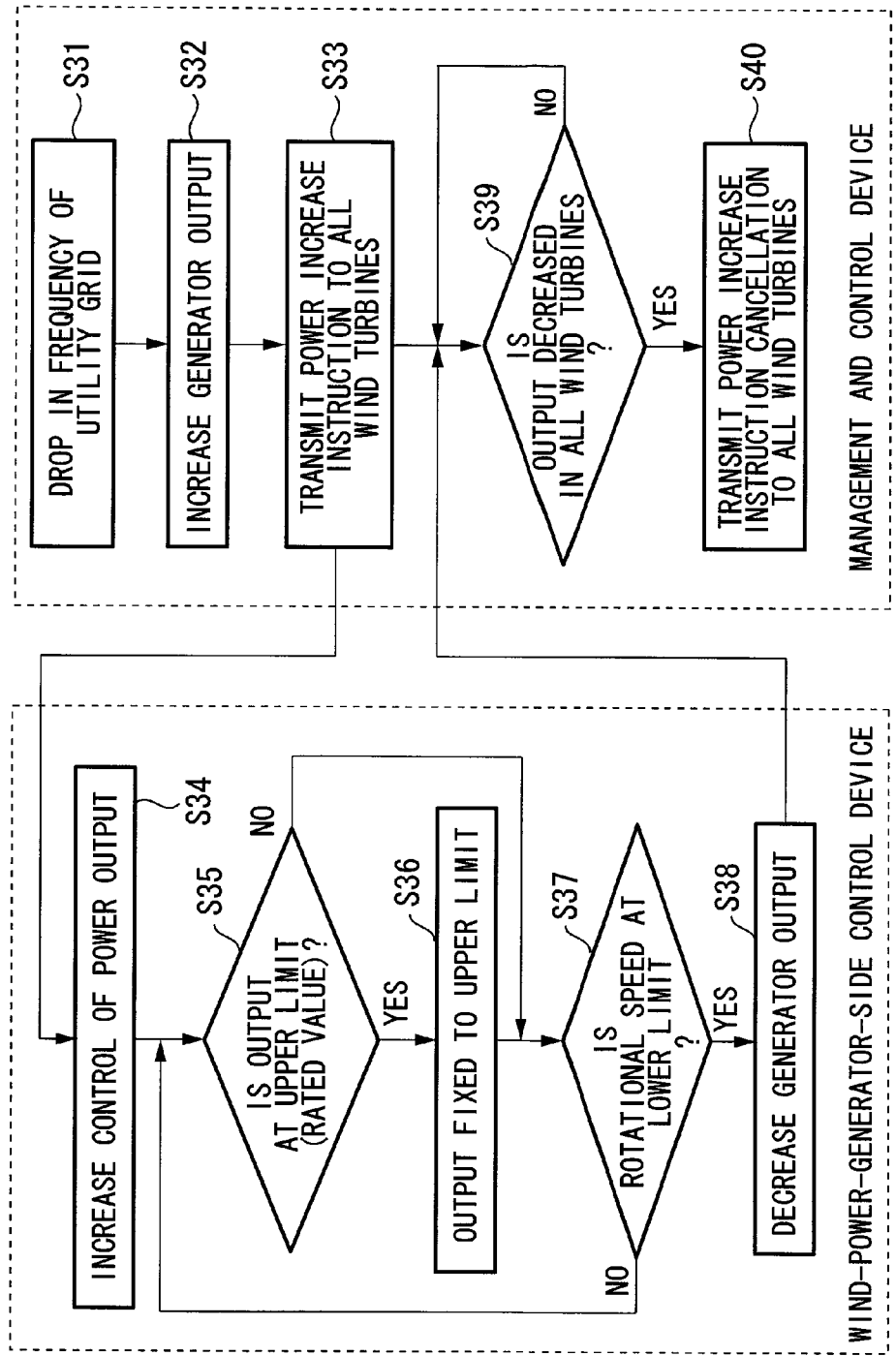
FIG. 8 is a flow chart illustrating a control process for when the frequency of the utility grid drops, in a wind turbine generator according to a second embodiment of the present invention.

FIG. 8 is a flow chart illustrating a control process for when the frequency of the utility grid drops, in the wind turbine generator system according to this embodiment.

In Step S31, the management and control device detects the grid frequency, detects when the grid frequency becomes smaller than or equal to a predetermined rated value, and proceeds to the next Step S32. The detection of the grid frequency may be based on an output from sensors provided on the individual wind turbine generators; the management and control device may be provided with a sensor that independently detects the grid frequency; or instructions from a power company managing the utility grid may be used instead.

In the next Step S32, the management and control device responds to a drop in the grid frequency and determines that the power output of the wind turbine generator system is to be increased, and the process proceeds to the next Step S33. This is because the utility grid is stabilized by suppressing the fluctuation in the grid frequency by raising the power output. In Step S33, power increase instructions (first control signals) for increasing the power output of each wind turbine generator 1 are transmitted from the management and control device to all of the wind turbine generators 1 connected to the management and control device.

In Step S34, the control device 20 of each wind turbine generator 1 receives a power increase instruction from the management and control device and, in response to the power increase instruction, performs control to increase its power output. Specifically, similar to the wind turbine generator 1 according to the first embodiment described above, the pitch control unit 22 performs control to set the pitch angle of the blades 8 to "fine", or the converter control unit 21 controls the generator-side inverter 14 to increase the power output.

In the next Step S35, the main control unit 23 of the wind turbine generator 1 calculates the power output to the utility grid 13 in response to the detection results of the output current Igrid and the voltage Vgrid from the sensor 19 and determines whether or not the power output, which is the calculated result, is greater than or equal to a predetermined rated value. According to this determination, when the power output is smaller than the predetermined rated value, the process proceeds to Step S37, and when it is determined that the power output is greater than or equal to the predetermined rated value, the process proceeds to Step S36. In Step S36, the control device 20 fixes the power output to an upper limit (rated value) by controlling the pitch angle of the blades 8 and the generator-side inverter 14.

In Step S37, it is determined whether or not the rotational speed of the generator 5 is smaller than a lower limit. According to this determination, when the rotational speed of the generator 5 is determined not to be smaller than the lower limit, the process returns to Step S35 to repeat the processing described above, and when the rotational speed of the generator 5 is determined to be smaller than the lower limit, the process proceeds to the next Step S38.

In Step S38, when the rotational speed of the generator 5 is smaller than the lower limit, the operation of the wind turbine generator 1 cannot be continued if the rotational speed drops even more. Therefore, to avoid this, the control device 20 controls the wind turbine generator 1 so as to decrease the power output. When the power output of the wind turbine generator 1 is decreased, the control device 20 transmits the information to the management and control device.

In Step S39, it is determined whether or not the management and control device receives information from each wind turbine generator 1 about decreasing the power output and whether or not the power output of all of the wind turbine generators 1 is decreased. This determination is repeated until the power output of every wind turbine generator 1 is decreased, and when it is determined that the power output of every wind turbine generator is decreased, the process proceeds to the next Step S40. In Step S40, a cancellation instruction indicating cancellation of the power increase instruction transmitted in Step S33 is transmitted to all of the wind turbine generators 1 in response to the decrease in the power output of all wind turbine generators 1, and the routine ends.

Figure 9:
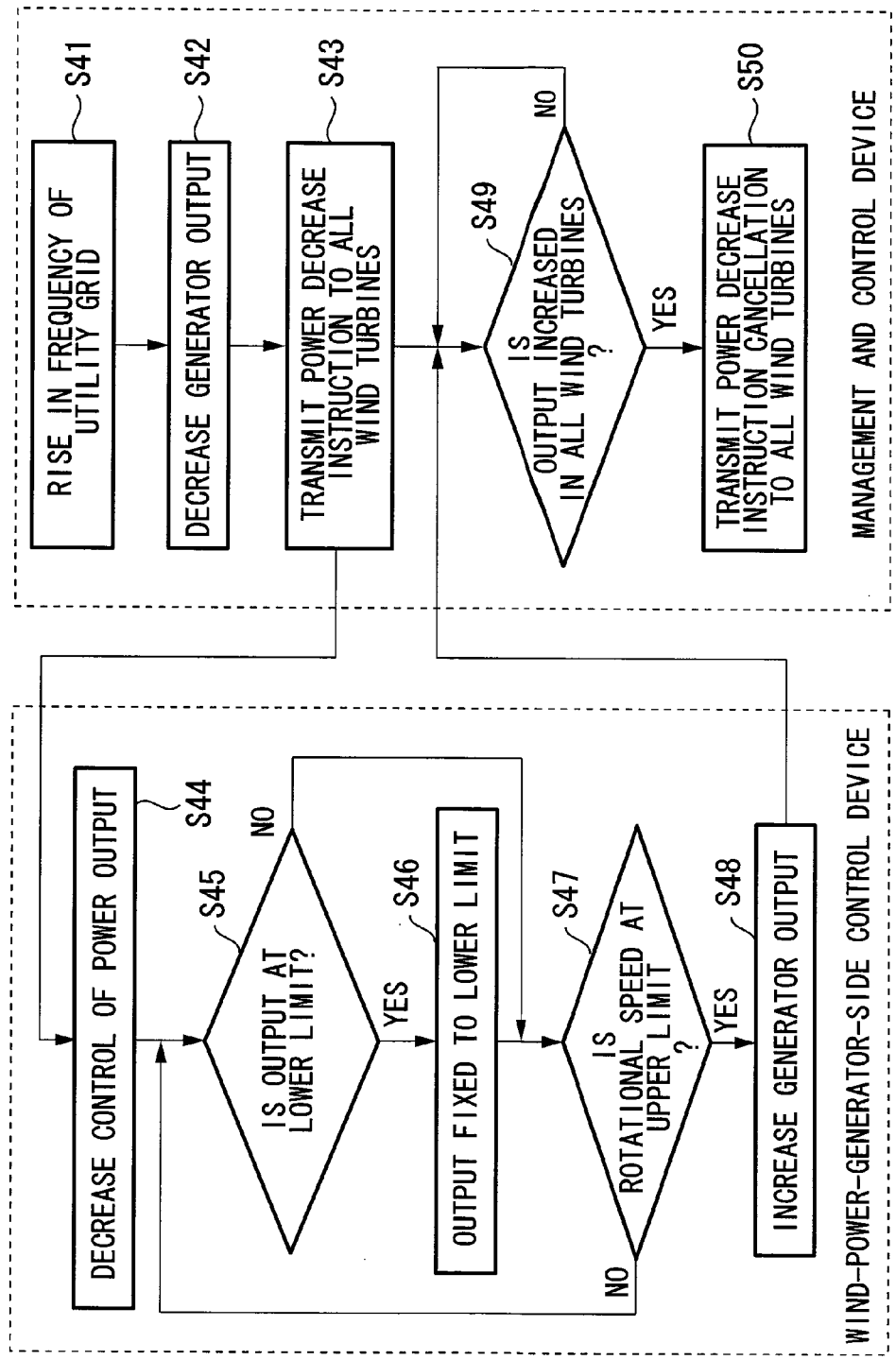
FIG. 9 is a flow chart illustrating a control process for when the frequency of the utility grid rises, in the wind turbine generator according to the second embodiment of the present invention.

FIG. 9 is a flow chart illustrating a control process for when the frequency of the utility grid, rises in the wind turbine generator system according to this embodiment.

In Step S41, the management and control device detects the grid frequency, detects that the grid frequency is greater than or equal to the predetermined rated value, and proceeds to the next Step S42. The detection of the grid frequency may be based on the output from sensors provided on the individual wind turbine generators; the management and control device may be provided with a sensor that independently detects the grid frequency; or instructions from a power company managing the utility grid may be used instead.

In the next Step S42, the management and control device responds to a rise in the grid frequency and determines that the power output of the wind turbine generator system should be decreased, and the process proceeds to the next Step S43. This is because the utility grid is stabilized by suppressing the fluctuation in the grid frequency by causing a drop in the grid frequency. In Step S43, power decrease instructions (second control signals) for causing a drop in the power output of each wind turbine generator 1 are transmitted from the management and control device to all of the wind turbine generators 1 connected to the management and control device.

In Step S44, the control device 20 of each wind turbine generator 1 receives a power decrease instruction from the management and control device and carries out control in response to the power decrease instruction to decrease its power output. Specifically, similar to the wind turbine generator 1 according to the first embodiment described above, the pitch control unit 22 controls the pitch angle of the blades 8 to "feather", or the converter control unit 21 controls the generator-side inverter 14 such that the power output is decreased.

In the next Step S45, the main control unit 23 of the wind turbine generator 1 calculates the power output to the utility grid 13 in response to the detection results of the output current Igrid and the voltage Vgrid from the sensor 19 and determines whether or not the power output, which is the calculated result, is greater than or equal to a predetermined lower limit. According to this determination, when the power output is greater than the predetermined lower limit, the process proceeds to Step S47, and when the power output is smaller than or equal to the predetermined lower limit, the process proceeds to Step S46. In Step S46, the power output is fixed to the lower limit by the control device 20 controlling the pitch angle of the blades 8 and the generator-side inverter 14.

In Step S47, it is determined whether or not the rotational speed of the generator 5 is greater than or equal to an upper limit. According to this determination, when it is determined that the rotational speed of the generator 5 is not greater than or equal to the upper limit, the process returns to Step S45 to repeat the above-described processing, and when it is determined that the rotational speed of the generator 5 is greater than or equal to the upper limit, the process proceeds to the next Step S48. In Step S48, if the rotational speed rises even more when the rotational speed of the generator 5 is greater than or equal to the upper limit, the corresponding wind turbine generator 1 might be damaged by over-speed. To avoid this, the control device 20 controls the wind turbine generator 1 so as to increase the power output. When the power output of the wind turbine generator 1 is increased, the control device 20 transmits information about increasing the power output of the wind turbine generator 1 to the management and control device.

In Step S49, it is determined whether or not the management and control device receives from each wind turbine generator 1 information about increasing the power output and whether or not the power output of all of the wind turbine generators 1 is increased. This determination is repeated until the power output of every wind turbine generator 1 is increased, and when it is determined that the power output of every wind turbine generator is increased, the process proceeds to the next Step S50. In Step S50, a cancellation instruction indicating cancellation of the power decrease instruction transmitted in Step S43 is transmitted to all of the wind turbine generators 1 in response to the decrease in the power output of all wind turbine generators 1, and the routine ends.

The configuration may be such that the cancellation instruction is transmitted when the grid frequency recovers to the rated frequency or when a predetermined amount of time elapses. In the embodiment described above, control signals, such as the power increase instructions and the power decrease instructions from the management and control device, are transmitted to all of the wind turbine generators. The configuration, however, does not necessarily have to be such a configuration, and instructions may be sent to some of the wind turbine generators.

Furthermore, the configuration can be such that, as a result of each wind turbine generator receiving power increase instructions or power decrease instructions from the management and control device, the power output may be immediately controlled in accordance with the instructions. In addition, the configuration can be such that, each wind turbine generator determines, on the basis of the power increase instruction or the power decrease instruction from the management and control device, whether or not the control device of the corresponding wind turbine generator is to perform control of the power output.

The embodiment described above has a configuration in which the fluctuation in the frequency is determined with reference to a predetermined rated frequency. The configuration, however, is not limited thereto and may be a configuration in which an allowable range is set for the predetermined rated frequency, and the fluctuation in the frequency is determined on the basis of whether or not the frequency is within the allowable range.

In this way, according to this embodiment, stabilization of the utility grid can be achieved when frequency fluctuation occurs in the utility grid by arbitrarily increasing or decreasing the power output of the wind turbine generator system including a plurality of wind turbine generators to correspond to the fluctuation in the frequency of the utility grid under various wind conditions and with various rotational speeds of the generators.

What is claimed is:

1. A wind turbine generator comprising:
a rotor that rotates by wind power;
a generator that is driven by rotation of the rotor; and
a control device that controls a power output of the generator to increase while a rotational speed of the generator decreases when a frequency of a utility grid becomes smaller than or equal to a predetermined rated frequency and when the rotational speed of the generator is greater than or equal to a first predetermined value.

2. The wind turbine generator according to claim 1, wherein the control device controls the power output to decrease when the rotational speed of the generator becomes smaller than the first predetermined value.

3. The wind turbine generator according to claim 2, wherein the control device performs control to maintain a predetermined rated output when the power output reaches the predetermined rated output.

4. The wind turbine generator according to claim 1, wherein the control device performs control to maintain a predetermined rated output when the power output reaches the predetermined rated output.

5. A wind turbine generator comprising:
a rotor that rotates by wind power;
a generator that is driven by rotation of the rotor; and
a control device that controls a power output of the generator to decrease while a rotational speed of the generator increases when a frequency of a utility grid becomes greater than or equal to a predetermined rated frequency and when the rotational speed of the generator is smaller than a second predetermined value.

6. The wind turbine generator according to claim 5, wherein the control device controls the power output to increase when the rotational speed of the generator becomes greater than or equal to the second predetermined value.

7. The wind turbine generator according to claim 6, wherein the control device performs control to maintain a predetermined power output when the power output drops to the predetermined power output.

8. The wind turbine generator according to claim 5, wherein the control device performs control to maintain a predetermined power output when the power output drops to the predetermined power output.

9. A control method for a wind turbine generator including a rotor that rotates by wind power and a generator that is driven by rotation of the rotor, the method comprising the step of:
   controlling a power output of the generator to increase while a rotational speed of the generator decreases when a frequency of a utility grid becomes smaller than or equal to a predetermined rated frequency and when the rotational speed of the generator is greater than or equal to a first predetermined value.

10. A control method for a wind turbine generator including a rotor that rotates by wind power and a generator that is driven by rotation of the rotor, the method comprising the step of:
    controlling a power output of the generator to decrease while a rotational speed of the generator increases when a frequency of a utility grid becomes greater than or equal to a predetermined rated frequency and when the rotational speed of the generator is smaller than a second predetermined value.

11. A wind turbine generator system comprising:
    a plurality of wind turbine generators each including a rotor that rotates by wind power and a generator that is driven by rotation of the rotor; and
    a management and control device that controls the plurality of wind turbine generators by transmitting a predetermined control signal to the plurality of wind turbine generators,
    wherein the management and control device transmits a first control signal for increasing power output to the wind turbine generators when a frequency of a utility grid becomes smaller than or equal to a predetermined rated frequency, and
    wherein, in response to the first control signal, each of the wind turbine generators increases the power output of the generator thereof while the rotational speed of the generator thereof decreases when the rotational speed of the generator thereof is greater than or equal to a first predetermined value.

12. A wind turbine generator system comprising:
    a plurality of wind turbine generators each including a rotor that rotates by wind power and a generator that is driven by rotation of the rotor; and
    a management and control device that controls the plurality of wind turbine generators by transmitting a predetermined control signal to the plurality of wind turbine generators,
    wherein the management and control device transmits a second control signal for decreasing power output to the wind turbine generators when a frequency of a utility grid becomes greater than or equal to a predetermined rated frequency, and
    wherein, in response to the second control signal, each of the wind turbine generators decreases the power output of the generator thereof while the rotational speed of the generator thereof increases when the rotational speed of the generator thereof is smaller than a second predetermined value.

13. A control method for a wind turbine generator system including a plurality of wind turbine generators each having a rotor that rotates by wind power and a generator that is driven by rotation of the rotor and a management and control device that controls the plurality of wind turbine generators by transmitting a predetermined control signal to the plurality of wind turbine generators, the method comprising:
    a step of transmitting, from the management and control device to the wind turbine generators, a first control signal for increasing power output when a frequency of a utility grid becomes smaller than or equal to a predetermined rated frequency; and
    a step of increasing, in each of the wind turbine generators, the power output of the generator thereof in response to the first control signal while a rotational speed of the generator thereof decreases when the rotational speed of the generator thereof is greater than or equal to a first predetermined value.

14. A control method for a wind turbine generator system including a plurality of wind turbine generators each having a rotor that rotates by wind power and a generator that is driven by rotation of the rotor and a management and control device that controls the plurality of wind turbine generators by transmitting a predetermined control signal to the plurality of wind turbine generators, the method comprising:
    a step of transmitting, from the management and control device to the wind turbine generators, a second control signal for decreasing power output when a frequency of a utility grid becomes greater than or equal to a predetermined rated frequency; and
    a step of decreasing, in each of the wind turbine generators, the power output of the generator thereof decreases in response to the second control signal while the rotational speed of the generator thereof increases when the rotational speed of the generator thereof is smaller than a second predetermined value.

* * * * *